(12) United States Patent
Sehn

(10) Patent No.: US 9,407,712 B1
(45) Date of Patent: Aug. 2, 2016

(54) CONTENT DELIVERY NETWORK FOR EPHEMERAL OBJECTS

(71) Applicant: Snapchat, Inc., Venice, CA (US)

(72) Inventor: Timothy Sehn, Marina Del Ray, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/977,315

(22) Filed: Dec. 21, 2015

Related U.S. Application Data

(63) Continuation of application No. 14/510,034, filed on Oct. 8, 2014, now Pat. No. 9,237,202, which is a continuation of application No. 14/201,707, filed on Mar. 7, 2014, now Pat. No. 8,909,725.

(51) Int. Cl.
 *G06F 15/16* (2006.01)
 *H04L 29/08* (2006.01)
 *H04L 12/58* (2006.01)

(52) U.S. Cl.
 CPC .............. *H04L 67/26* (2013.01); *H04L 51/08* (2013.01); *H04L 67/2842* (2013.01)

(58) Field of Classification Search
 CPC ...... H04L 67/26; H04L 67/2842; H04L 51/08
 See application file for complete search history.

(56) References Cited

U.S. PATENT DOCUMENTS

| | | | |
|---|---|---|---|
| 5,999,932 A | 12/1999 | Paul | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 7,124,164 B1 | 10/2006 | Chemtob | |
| 7,149,893 B1 | 12/2006 | Leonard et al. | |
| 7,203,380 B2 | 4/2007 | Chiu et al. | |
| 7,243,163 B1 | 7/2007 | Friend et al. | |
| 7,356,564 B2 | 4/2008 | Hartselle et al. | |
| 7,519,670 B2 | 4/2009 | Hagale et al. | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,379,130 B2 | 2/2013 | Forutanpour et al. | |

(Continued)

OTHER PUBLICATIONS

Copenheaver, Blaine (Examiner), International Search Report and Written Opinion issued to international patent application No. PCT/US2015/037251, Sep. 29, 2015, 7 pgs.

(Continued)

*Primary Examiner* — Larry Donaghue

(74) *Attorney, Agent, or Firm* — Cooley LLP

(57) ABSTRACT

A computer implemented method includes receiving an object scheduled for automatic deletion after a specified viewing period, a specified number of views or a specified period of time. Object push criteria are evaluated. The object is pushed to an edge server cache in response to evaluating. The object is served in response to a request for the object.

11 Claims, 3 Drawing Sheets

(56) References Cited

U.S. PATENT DOCUMENTS

| | | |
|---|---|---|
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,687,021 B2 | 4/2014 | Bathiche et al. |
| 8,744,523 B2 | 6/2014 | Fan et al. |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 2002/0047868 A1 | 4/2002 | Miyazawa |
| 2002/0122659 A1 | 9/2002 | McGrath et al. |
| 2002/0144154 A1 | 10/2002 | Tomkow |
| 2003/0016247 A1 | 1/2003 | Lai et al. |
| 2003/0052925 A1 | 3/2003 | Daimon et al. |
| 2003/0126215 A1 | 7/2003 | Udell et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0055269 A1 | 3/2008 | Lemay et al. |
| 2008/0104503 A1 | 5/2008 | Beall et al. |
| 2008/0207176 A1 | 8/2008 | Brackbill et al. |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaundhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0197194 A1 | 8/2011 | D'Angelo et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0273575 A1 | 11/2011 | Lee |
| 2011/0283188 A1 | 11/2011 | Farrenkopf et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0210244 A1 | 8/2012 | deFrancisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |

(56) References Cited

U.S. PATENT DOCUMENTS

| | | | |
|---|---|---|---|
| 2014/0155102 | A1 | 6/2014 | Cooper et al. |
| 2014/0173457 | A1 | 6/2014 | Wang et al. |
| 2014/0189592 | A1 | 7/2014 | Benchenaa et al. |
| 2014/0207679 | A1 | 7/2014 | Cho |
| 2014/0214471 | A1 | 7/2014 | Schreiner, III |
| 2014/0279436 | A1 | 9/2014 | Dorsey et al. |
| 2014/0280537 | A1 | 9/2014 | Pridmore et al. |
| 2014/0282096 | A1 | 9/2014 | Rubinstein et al. |
| 2014/0317302 | A1 | 10/2014 | Naik |
| 2014/0325383 | A1 | 10/2014 | Brown et al. |
| 2015/0046278 | A1 | 2/2015 | Pei et al. |
| 2015/0116529 | A1 | 4/2015 | Wu et al. |
| 2015/0172534 | A1 | 6/2015 | Miyaka |

OTHER PUBLICATIONS

Ivisit, "iVisit Mobile Getting Started", Dec. 4, 2013, iVisit, pp. 1-16.

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self_destruct_in_60_seconds, referred to hereinafter as Read-Write.

Sawers, Paul, "Snapchat for iOS Lets You Send Photos to Friends and Set How long They're Visible for", May 7, 2012, <http://thenextweb.com/apps/2012/05/07/Snapchat-for-ios-lets-you-send-photos-to-friends-and-set-how-long-theyre-visiblefor/#!xCjrp>, pp. 1-5.

Shein, "Ephemeral Data", Communications of the ACM, vol. 56, No. 9, Sep. 2013, pp. 20-22.

Snapchat, "How Snaps Are Stored and Deleted", May 9, 2013, 3 pgs.

White, Charlie, "How to Enable the New Facebook Timeline Now", http://mashable.com/2011/09/22/how-to-facebook-timeline/, Sep. 22, 2011, pp. 1-18.

Young, Lee W. (Examiner), International Search Report and Written Opinion issued to International Patent Application No. PCT/US2014/040346, Mar. 23, 2015, 9 pgs.

CONTENT DELIVERY NETWORK FOR EPHEMERAL OBJECTS

CROSS REFERENCE TO RELATED APPLICATIONS

This application is a continuation of U.S. patent application Ser. No. 14/510,034, filed Oct. 8, 2014, which is a continuation of U.S. patent application Ser. No. 14/201,707 filed Mar. 7, 2014, now U.S. Pat. No. 8,909,725, the contents of which are incorporated herein by reference.

FIELD OF THE INVENTION

This invention relates generally to network communications. More particularly, this invention relates to a content delivery network for ephemeral objects.

BACKGROUND OF THE INVENTION

Traditional Content Delivery Networks (CDNs) work on a pull-based model. The CDN advertises a Hypertext Transport Protocol (HTTP) endpoint to the internet. Client requests are then routed to the closest (in internet terms) endpoint. If the target of the HTTP request is not in the cache of an endpoint, the CDN makes an origin (where the object is mastered) request, pulls the target of the HTTP request to the endpoint and caches the payload of the request. This adds additional latency. If the target of the HTTP request is in the cache, the request is served from the endpoint. These requests are served with lower latency because the object does not need to travel as far. Objects in the cache are evicted based on a predetermined model, such as a Least Recently Used model.

This approach is tailored for large objects that are read many times. This approach is not suitable for objects that are either read once or read very few times.

In view of the foregoing, it would be desirable to provide improved techniques for distributing ephemeral objects in a content delivery network.

SUMMARY OF THE INVENTION

A computer implemented method includes receiving an object scheduled for automatic deletion after a specified viewing period, a specified number of views or a specified period of time. Object push criteria are evaluated. The object is pushed to an edge server cache in response to evaluating. The object is served in response to a request for the object.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
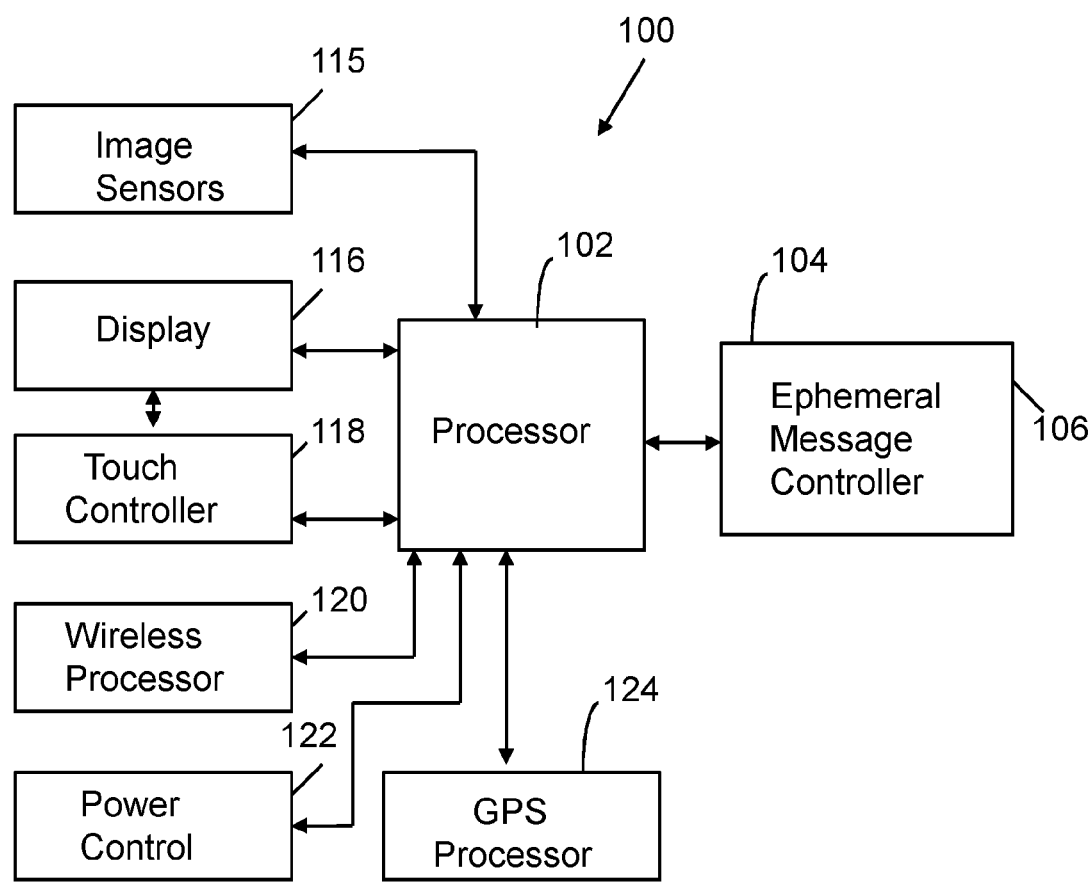
FIG. 1 illustrates a client device utilized in accordance with an embodiment of the invention.

FIG. 1 illustrates an electronic device 100 utilized in accordance with an embodiment of the invention. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106. The ephemeral message controller 106 includes executable instructions to display ephemeral messages. An ephemeral message may be a text, an image, a video and the like. The display time for the ephemeral message is typically set by the message sender. However, the display time may be a default setting or a setting specified by the recipient. Regardless of the setting technique, the message is transitory. That is, the message is automatically deleted after a specified viewing period, a specified number of views or a specified period of time (e.g., 24 hours). The ephemeral message controller 106 controls deletion of the object at the client device 100, while other controllers delete network instances of the object, as discussed below.

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 then an ephemeral message is displayed until its automatic deletion time is reached. The electronic device 100 may also include other components commonly associated with a smartphone, such as a wireless signal processor 120 to support wireless communications, a power control circuit 122 and a global positioning system processor 124.

Figure 2:
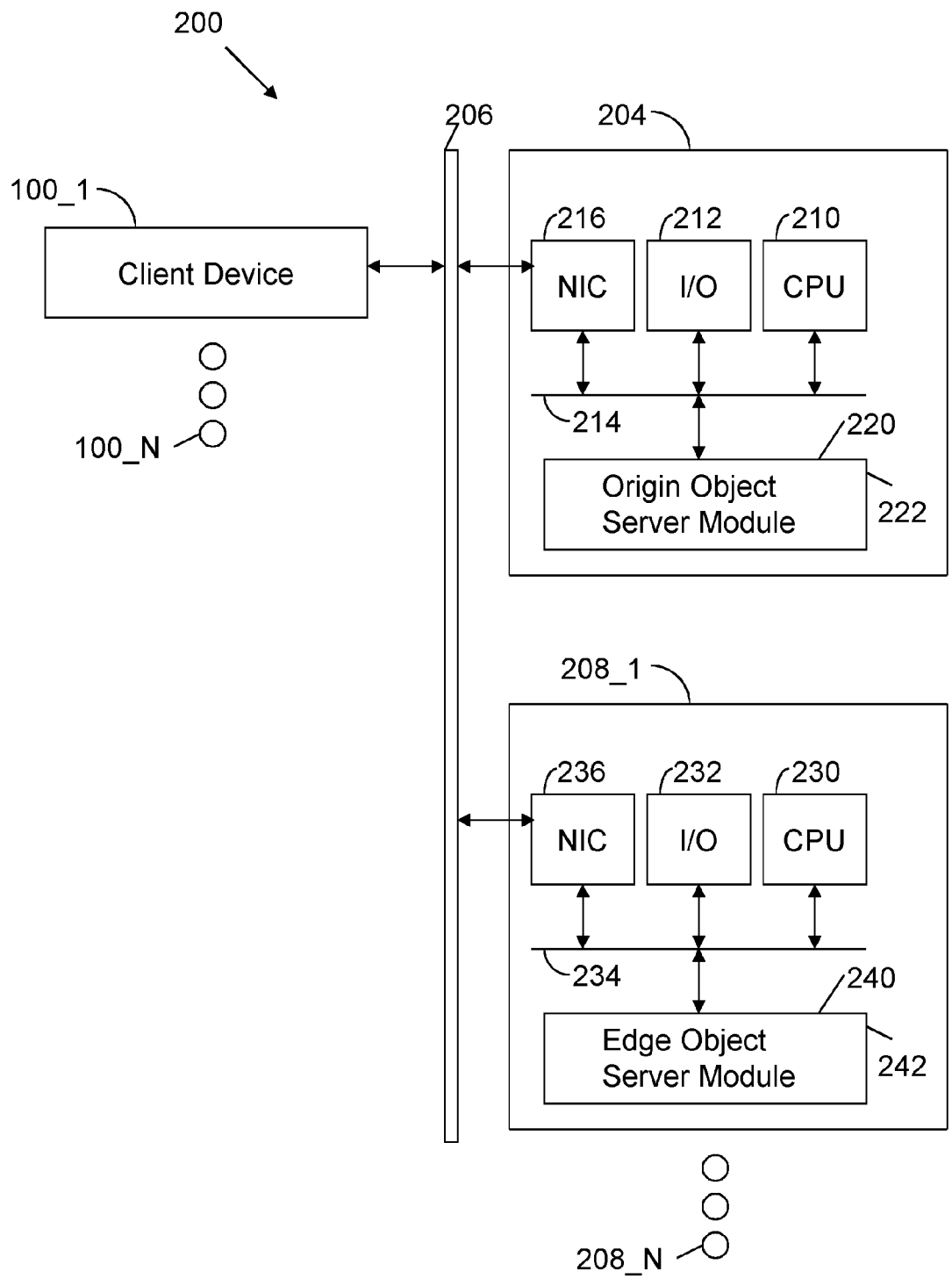
FIG. 2 illustrates a system configured in accordance with an embodiment of the invention.

FIG. 2 illustrates a system 200 configured in accordance with an embodiment of the invention. The system 200 includes a set of client devices 100_1 through 100_N. The client devices 100 are connected to a network 206, which is any combination of wireless and wired network communication devices. A server 204 is also connected to the network 206. The server 204 includes standard components, such as a central processing unit 210 and input/output devices 212 connected via a bus 214. The input/output devices 212 may include a keyboard, mouse, display and the like. A network interface circuit 216 is also connected to the bus 214 to provide connectivity to network 206. A memory 220 is also connected to the bus 214. The memory 220 includes modules with executable instructions, such as an origin object server module 222. The origin object server module 222 implements content delivery network operations for ephemeral objects, as discussed below. The memory 220 may also include executable instructions to support the receipt, distribution and deletion of ephemeral objects.

FIG. 2 also includes a set of edge servers 208_1 through 208_N. Each edge server 208 includes standard components, such as a central processing unit 230, input/output devices 232, a bus 234 and network interface circuit 236 to provide connectivity to network 206. A memory 240 is also connected to the bus 234. The memory 240 stores executable instructions, such as an edge object server module 242. The edge object server module 242 includes executable instructions to communicate with the origin object server module 222, receive ephemeral objects, serve ephemeral objects and automatically delete ephemeral objects after a specified viewing period, a specified number of views or a specified period of time.

The server 204 operates as an origin server in a content delivery network, while servers 208_1 operate as edge servers in the content delivery network. Client requests for ephemeral objects from the client devices 100 are serviced by the origin server 204 and/or one of the edge servers 208.

Figure 3:
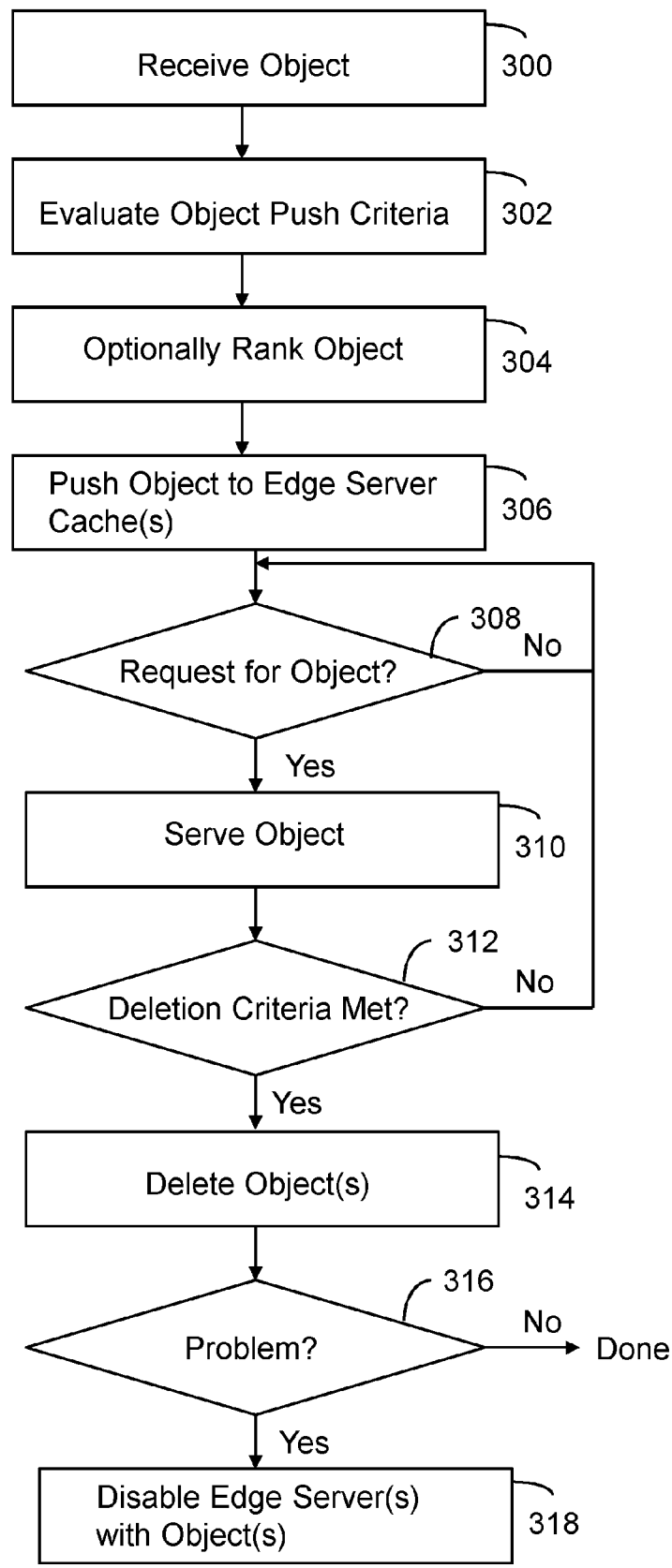
FIG. 3 illustrates processing operations associated with an embodiment of the invention.

FIG. 3 illustrates processing operations associated with an embodiment of the invention. Initially, an object is received 300. For example, a client device 100 generates an ephemeral photograph and associated text message, which is received by the server 204. The object may be a text message with an accompanying video or simply a photograph or video without a text message.

The origin object server module 222 evaluates object push criteria 302. In general, the push criteria specifies a set of policies for distributing the object to one or more edge servers 208 with the goal that a request for the object by a client device 100 is serviced by an edge server proximate to the client device 100. The object push criteria may include content delivery network traffic patterns. In this case, an object may be pushed to a specified edge server 208 for load balancing purposes.

The object push criteria may include historical use patterns of a user. The historical use patterns may assess how frequently a user processes objects, when a user processes objects (e.g., only at night) and other behaviors observed through prior consumption of ephemeral objects. Simple historical use pattern rules may be relied upon, such as push an object to an edge server only if the user hit that edge server in the last twenty-four hours.

The object push criteria may include a social graph associated with a user. In particular, a social graph and past history of communication between two users may be used to probabilistically deliver an object to an edge server that is likely to be accessed by a message recipient.

The object push criteria may also include geolocation information. The GPS processor 124 of client device 100 may deliver geolocation information to the origin object server module 222, which may be used to place an object at an edge server that is physically proximate to the geolocation of the user.

The next operation of FIG. 3 is to optionally rank the object 304. The ranking is for cache eviction management purposes. Observe that a Least Recently Used cache eviction protocol does not make sense because the object is being speculatively populated to the edge server cache. A ranking may be based upon historical use patterns of a user. For example, an object intended for a frequent user would be ranked higher than an object intended for an episodic user. Alternately, an object may be ranked based upon geolocation information such that objects pushed to edge servers close to the user are ranked higher than objects pushed to edge servers far from the user. The rank may be based upon available space versus the probability an object would be served from that edge server.

The next operation of FIG. 3 is to push the object to an edge server, such as an edge server cache 306. Observe here that the object is not sent to the edge server in response to a request, as is the typical case in a content delivery network. Rather, the object is speculatively pushed to the edge server based upon the object push criteria.

The next operation of FIG. 3 is to determine whether there is a request for the object 308. This condition may be tested at any number of edge servers. If there is such a request (308—Yes), the object is served 310. It is then determined whether deletion criteria is met 312. For example, the deletion criteria may dictate that the object is deleted after a single viewing of 3 seconds. Alternately, the deletion criteria may specify that the object is deleted after a specified number of views (either by a single individual or different individuals). Alternately, the deletion criteria may specify that the object is deleted after a specified period of time, such as 24 hours. If the deletion criteria is not met (312—No), the edge server waits for additional requests for the object 308. If the deletion criteria is met (312—Yes), the object or objects are deleted 314. This operation may entail deletion of the object at a number of edge servers. Therefore, the system determines if there is problem in the deletion process 316. For example, origin object server module 222 may supervise this deletion process. If there is no problem (316—No), then processing is complete. If there is a problem, (316—Yes), any number of remedial actions may be taken, including, if necessary, disabling any edge server containing the object 318. Different deletion strategies may be deployed. For example, one may delete every instance of the object except one instance, sever the one instance and then delete the final (one) instance. Alternately, the object may be served and then all deletion operations may be performed.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:
1. A computer implemented method, comprising:
receiving an ephemeral object scheduled for automatic deletion after a specified viewing period, a specified number of views or a specified period of time, wherein the ephemeral object has a designated recipient;
evaluating ephemeral object push criteria including behaviors observed through prior consumption of ephemeral objects by the designated recipient, wherein the object push criteria includes a history of communication between two users;

pushing the ephemeral object to an edge server cache in response to evaluating, wherein pushing is performed speculatively prior to the designated recipient requesting the ephemeral object; and ascribing a cache management rank to the ephemeral object based upon historical use patterns of the designated recipient.

2. The computer implemented method of claim 1 further comprising serving the ephemeral object from the edge server in response to a request for the ephemeral object by the designated recipient.

3. The computer implemented method of claim 1 wherein the ephemeral object is a message.

4. The computer implemented method of claim 1 wherein the ephemeral object is a message with an accompanying picture.

5. The computer implemented method of claim 1 wherein the ephemeral object is a message with an accompanying video.

6. A computer implemented method, comprising:

receiving an ephemeral object scheduled for automatic deletion after a specified viewing period, a specified number of views or a specified period of time, wherein the ephemeral object has a designated recipient;

evaluating ephemeral object push criteria including behaviors observed through prior consumption of ephemeral objects by the designated recipient, wherein the object push criteria includes a history of communication between two users;

pushing the ephemeral object to an edge server cache in response to evaluating, wherein pushing is performed speculatively prior to the designated recipient requesting the ephemeral object; and ascribing a cache management rank to the ephemeral object based upon geolocation information of the designated recipient.

7. The computer implemented method of claim 6 wherein the ephemeral object push criteria includes content delivery network traffic patterns.

8. The computer implemented method of claim 6 wherein the ephemeral object push criteria includes historical use patterns of a user.

9. The computer implemented method of claim 6 wherein the ephemeral object push criteria includes a social graph associated with a user.

10. The computer implemented method of claim 6 wherein the ephemeral object push criteria includes geolocation information.

11. A computer implemented method, comprising:

receiving an ephemeral object scheduled for automatic deletion after a specified viewing period, a specified number of views or a specified period of time, wherein the ephemeral object has a designated recipient;

evaluating ephemeral object push criteria including behaviors observed through prior consumption of ephemeral objects by the designated recipient, wherein the object push criteria includes a history of communication between two users;

pushing the ephemeral object from an origin object server to a plurality of edge servers in response to evaluating, wherein pushing is performed speculatively prior to the designated recipient requesting the ephemeral object;

checking with the origin object server for ephemeral object deletion problems at the plurality of edge servers; and disabling an edge server containing the ephemeral object that fails to delete the ephemeral object.

* * * * *